United States Patent
Kharatishvili et al.

(10) Patent No.: US 9,280,591 B1
(45) Date of Patent: Mar. 8, 2016

(54) EFFICIENT REPLICATION OF SYSTEM TRANSACTIONS FOR READ-ONLY NODES OF A DISTRIBUTED DATABASE

(71) Applicant: Amazon Technologies, Inc., Reno, NV (US)

(72) Inventors: Tengiz Kharatishvili, Sammamish, WA (US); Pradeep Jnana Madhavarapu, Mountain View, CA (US); Anurag Windlass Gupta, Atherton, CA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 14/033,343

(22) Filed: Sep. 20, 2013

(51) Int. Cl.
G06F 7/00 (2006.01)
G06F 17/00 (2006.01)
G06F 17/30 (2006.01)

(52) U.S. Cl.
CPC .................... G06F 17/30575 (2013.01)

(58) Field of Classification Search
CPC ............... G06F 17/30575; G06F 17/30368
USPC ............................................. 707/624
See application file for complete search history.

(56) References Cited

U.S. PATENT DOCUMENTS

| | | | |
|---|---|---|---|
| 5,280,612 A | 1/1994 | Lorie et al. | |
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |

(Continued)

FOREIGN PATENT DOCUMENTS

EP      0675451      10/1995

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Binh V Ho
(74) *Attorney, Agent, or Firm* — Robert C. Kowert; Meyertons, Hood, Kivlin, Kowert & Goetzel, P.C.

(57) ABSTRACT

A distributed database system may efficiently replicate system transactions one or more read-only nodes. An update to a distributed database may be received. One or more system transactions may be performed to apply the update. For each system transaction, one or more change notifications may be generated which indicate changes to be applied in order to perform the system transaction. A particular one of the change notifications may be identified as the last change to be applied in order to complete the system transaction. The change notifications may be sent to one or more read-only nodes. The read-only nodes may process read requests for the distributed database system. The identified change notification may indicate to the read-only nodes the last change to be applied prior to presenting a state of the database that includes the system transaction when servicing read requests.

20 Claims, 9 Drawing Sheets

(56) References Cited

U.S. PATENT DOCUMENTS

| | | | |
|---|---|---|---|
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,308,456 B2 | 12/2007 | Friske et al. | |
| 7,310,613 B2* | 12/2007 | Briel | G06Q 30/0641 705/27.1 |
| 7,483,846 B1* | 1/2009 | Kumar | G06Q 30/02 705/14.35 |
| 7,716,645 B2 | 5/2010 | Dolby et al. | |
| 7,747,663 B2 | 6/2010 | Atkin et al. | |
| 7,797,306 B1* | 9/2010 | Pather | G06F 17/30867 707/714 |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,719,432 B1* | 5/2014 | Vermeulen | G06F 9/526 707/704 |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0193655 A1* | 9/2004 | Miyata | G06F 17/30575 |
| 2004/0249869 A1 | 12/2004 | Oksanen | |
| 2007/0162516 A1* | 7/2007 | Thiel | G06F 17/30578 |
| 2008/0183973 A1 | 7/2008 | Aguilera et al. | |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0106928 A1* | 5/2011 | Gokurakuji | H04L 67/06 709/223 |
| 2011/0161496 A1 | 6/2011 | Nicklin | |
| 2011/0173495 A1* | 7/2011 | Qian | H04L 1/1848 714/18 |
| 2012/0041899 A1 | 2/2012 | Greene et al. | |
| 2012/0174112 A1 | 7/2012 | Vaidya et al. | |
| 2012/0191648 A1 | 7/2012 | Kuber et al. | |
| 2012/0297073 A1 | 11/2012 | Glover et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2013/0036089 A1* | 2/2013 | Lucas | G06F 17/30283 707/615 |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0279930 A1* | 9/2014 | Gupta | G06F 11/1464 707/683 |

OTHER PUBLICATIONS

"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11g-SQL-Query-Result-Set-Caching.htm, pp. 1-7.
"Oracle Database JDBC Developer's Guide and Reference: Chapter 20 Statement and Result Set Caching" downloaded from http://docs.oracle.com/cd/B28359_01/java.111 1b31224/stmtcach.htm via the Wayback Machine Nov. 27, 2011, pp. 1-8.
Adrian Billington "Query Result Cache in Oracle 11g" downloaded from http://web.archive.org/web/20080124161135/ http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
U.S. Appl. No. 61/794,572, filed Mar. 15, 2013, Anurag Windlass Gupta, et al.
U.S. Appl. No. 61/799,609, filed Mar. 15, 2013, Anurag Windlass Gupta, et al.
U.S. Appl. No. 61/794,612, filed Mar. 15, 2013, Pradeep Jnana Madhavarapu et al.
U.S. Appl. No. 61/794,658, filed Mar. 15, 2013, Anurag Windlass Gupta, et al.
U.S. Appl. No. 61/799,632, filed Mar. 15, 2013, Anurag Windlass Gupta, et al.
U.S. Appl. No. 13/892,027, filed May 10, 2013, Anurag Windlass Gupta, et al.
U.S. Appl. No. 13/873,467, filed Apr. 30, 2013, Anurag Windlass Gupta, et al.
U.S. Appl. No. 13/902,381, filed May 24, 2013, Anurag Windlass Gupta, et al.
U.S. Appl. No. 13/893,004, filed May 13, 2013, Laurion Darrell Burchall et al.
U.S. Appl. No. 13/901,111, filed May 23, 2013, Anurag Windlass Gupta, et al.
U.S. Appl. No. 13/894,969, filed May 15, 2013, Grant Alexander MacDonald McAlister et al.
U.S. Appl. No. 13/903,674, filed May 28, 2013, Anurag Windlass Gupta, et al.
U.S. Appl. No. 14/032,721, filed Sep. 20, 2013, Tengiz Kharatishvili et al.
U.S. Appl. No. 14/032,797, filed Sep. 20, 2013, Pradeep Jnana Madhavarapu et al.
U.S. Appl. No. 14/036,783, filed Sep. 25, 2013, Anurag Windlass Gupta, et al.
U.S. Appl. No. 14/036,792, filed Sep. 25, 2013, Samuel James McKelvie, et al.
U.S. Appl. No. 14/032,763, filed Sep. 20, 2013, Yan Valerie Leshinsky et al.
U.S. Appl. No. 14/032,681, filed Sep. 20, 2013, Samuel James McKelvie, et al.

* cited by examiner

EFFICIENT REPLICATION OF SYSTEM TRANSACTIONS FOR READ-ONLY NODES OF A DISTRIBUTED DATABASE

BACKGROUND

Distribution of various components of a software stack can, in some cases, provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, complex to maintain, and may over-serve many database use cases.

A read replica model that is used to scale out read processing. According to a typical read replica model, as changes are made to the structure of the database, a SQL record may be created in a logical replication log which may then be propagated to all the replicas. Each replica would then run these SQL statements locally on their own versions of the database. As the logs are shipped asynchronously, the read replica operates at some lag from the primary database, and there is some loss of data if the read replica needs to be promoted to be a primary.

Figure 1:
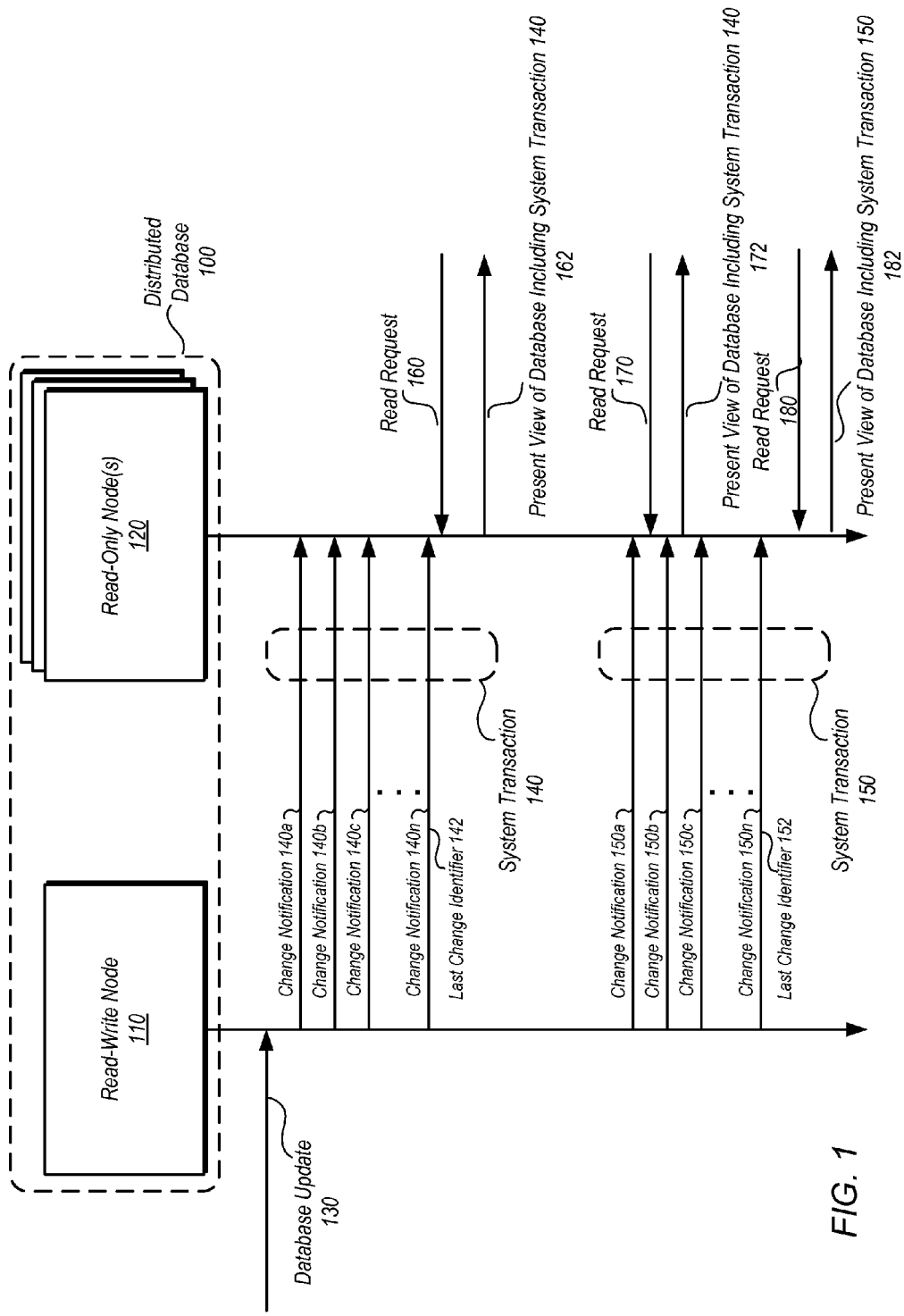
FIG. 1 is a sequence diagram illustrating efficient replication of system transactions for read-only nodes of a distributed database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of efficiently replicating system transactions for read-only replicas of a distributed database system are disclosed. Various ones of the present embodiments may include a read-write node (or "leader," "master," or "primary" node) of a database service receiving, from a client of the database service, an update, such as a write request, that specifies a modification to be made to data maintained by the distributed database. The read-write node may then apply the requested update, such as by modifying one or more in-memory data structures (e.g., database cache, database dictionary, transaction list, etc.). Different changes made in order to perform the requested update may be grouped into one or more system transactions (sometimes referred to as "mini-transactions"). In some embodiments, a system transaction may, from the perspective of a client or other external system be considered atomic, that is a system transaction is either performed or not performed. While user transactions may only be partially complete such that a user may designate that incomplete user transactions be undone in order to maintain a consistent state. In at least some embodiments, the read-write node may also generate one or more change notifications, such as redo log records, cache invalidation messages, or update internal memory data messages, corresponding to the changes made as part of a system transaction. These change notifications may be sent to one or more read-only nodes (sometimes referred to as "read-replicas"). Particular ones of the change notifications may be identified as the last change of a system transaction, indicating to a read-only node that the last change is to be applied prior to presenting a view of the database including the changes of the respective system transaction. In this way, read requests received at read-only nodes may not be exposed to partial or incomplete changes to data maintained for the database. Including not only changes made to data, but also changes made to system metadata maintained in-memory, may allow read-only nodes to efficiently apply changes, reducing change lag between the read-write node and the read-only nodes.

Allowing different configurations of database components in order to optimize various operations performed is one advantage of distributed database systems. Read-only nodes (or read replicas), for instance, may allow a distributed database system to more efficiently respond to read queries by operating as a replica of the database managed at a read-write node, which may provide better service for applications with read-heavy database workloads. However, replicating updates made at a read-write node (or other component responsible for processing updates to the distributed database, such as a leader node or master node) may prove difficult. FIG. 1 provides an illustration of efficient replication of system transactions for read-only nodes of a distributed database, according to some embodiments.

Distributed database 100 may be a database system that maintains data for one or more clients, applications, or systems that utilize distributed database 100. A database table, for instance, or various other schemas (e.g., relational database), structures, or objects may be employed to organize data maintained by distributed database 100. Distributed database 100 may be configured to process any number of updates, requests, operations, or transactions with regard to storing and maintaining data for the database. Various different hardware and software components, such as servers or computing systems (e.g., computing system 1000 described below with regard to FIG. 9) may be used to implement different components within distributed database 100. Virtual nodes or instances may be implemented, for example, that function independently, even though they may be implemented on the same component or a lesser number of physical hardware components than the number of nodes.

As illustrated in FIG. 1, a read-write node 110 may be implemented as part of distributed database 100. Read-write node 110 may be configured to receive read or write requests from clients, systems, or other components/devices external to distributed database 100. A write request, for example, may be received at read-write node 110 that requests a value of a particular record maintained by distributed database 100 be modified to a new value. Read-write node 110 may also be configured to process read requests, such as the request for one or more records, data values, or other portions of data maintained by distributed database 100. In at least some embodiments, read-write node 110 may be configured to process database updates or requests for the database, while other components, such as read-only nodes 120, may be configured to perform other operations.

In FIG. 1, read-only nodes 120 may process and respond to read requests, such as by providing a requested one or more records, data values, or other portions of data maintained by distributed database 100. The read requests processed by read-only nodes 120 may request data that is currently being, or recently been updated by operations performed by read-write node 110. Read-only nodes 120 may, therefore, operate as a replica of a consistent state of distributed database 100 in order to prevent returning data in a response to a read request that is not consistent with data storage or other devices persisting data for distributed database 100.

Database update 130 may, in various embodiments, be a write request or other operation that modifies data maintained by distributed database 100. In various embodiments, a database update 130 may be a user transaction or other update comprising multiple operations to be performed. For instance, database update 130 may request a record value be modified and a new record be inserted into a log table that records the change. Upon receiving database update 130, read-write node 110 may evaluate the update request and determine one or more system transactions to be performed in order to apply database update 130 to distributed database 100. A system transaction, as noted above, may be perceived from the perspective of the client requesting the database update as an atomic operation, unlike a user transaction which a user may have to specify that the transaction commit only if all of the transaction steps are performed. Using the above example, a system transaction may be the operation to insert a new record into the log table. Performed as a system transaction, the new record may thus be either inserted, or not, in the database table. Although the system transaction may appear atomic to a client, performing the system transaction may include multiple changes. If, for instance, a b-tree structure is used by distributed database 100 to index data, multiple changes may be made to the b-tree structure (e.g., add a new leaf node, split a parent node, create a new root node, etc.), as well as changes to one or more data objects, such as data pages, which may be used to store data values for the new record. In at least some embodiments, changes may be made to system metadata, such as one or more internal data structures used to describe the database as well as process access requests or updates to the database. System metadata may, for example, include data dictionaries, which may provide various metadata regarding database objects (e.g., table names, number of columns, number of rows, etc.), or transaction management data (e.g., list of active transactions, various states of the transactions, etc.). Changes, in some embodiments, may also be made to actual data maintained for the database. If for instance, data is organized into data pages or blocks, changes may be made to one or more values in a data page/block. A database cache, or some other data structure, may be implemented to which these changes may be applied.

Read-write node 110 may perform these various changes associated with a system transaction. Read-write node may also generate and send change notifications corresponding to the changes of a system transaction to read-only nodes 120 in order to replicate the system transaction on read-only nodes 120. Change notifications may, in some embodiments, be formatted according to one of various application programmer interfaces (APIs) or messaging formats. Some of the change notifications sent corresponding to a system transaction may be one or more log records (e.g., redo log records) that may indicate the changes made to respective data maintained for the database.

Multiple changes may be made in order to perform system transaction 140, in various embodiments. System transaction 140, for instance may be described by any number of changes that have corresponding change notifications, such as change notifications 140*a*, 140*b*, 140*c*, to 140*n*. Read-write node 110 may also identify a particular one of the change notifications as the last change to be applied in order to complete system transaction 140, which in this example is change notification 140*n*. A last change identifier 142, such as a number, or other value or indicator, may be included in change notification 140*n* to indicate the change notification 140*n* is the last change to be applied at read-only nodes 120 as part of system transaction 140.

Change notifications 140*a*, 140*b*, 140*c*, through 140*n* may be sent to read-only nodes 120. In some embodiments, change notifications may be sent in a sequence or ordering, such as the ordering in which they are performed, or generated, at read-write node 110. Sequence numbers or other identifiers may also be included in the change notifications which may indicate such a sequence or ordering (or to detect missing or corrupt change notifications). Read-only nodes 120 may apply the changes indicated in change notifications 140*a*, 140*b*, 140*c*, through 140*n*, as they are received, in various embodiments. Thus, when a read request is received, read-only nodes 120 may not delay responding to the request in order to apply the changes. If, for example, some of change notifications 140*a*-140*n* describe changes to system metadata, which may include changes to a data dictionary in order to indicate the addition of another column for a database table, the data dictionary may already be updated to indicate that the table includes the additional column, even if the data for the column has not yet been received and/or stored.

Read-only nodes may receive a read request 160. A determination may be made as to the consistent state or view of the database to be presented when responding to the read request. If, for instance, system transaction 140 modified a record value and read request 160 requests the data from that record, whether or not the modified record value is presented in the response may be based on last change identifier 142. If read-only nodes 120 have received change notification 140*n* that includes last change identifier 142, then read-only nodes 120 may present a view of the database including system transaction 140, illustrated at 162, in response to the read request 162. Similar determinations may be made when processing subsequent read requests.

If, as illustrated in FIG. 1, another system transaction 150 is to be replicated at read-only nodes 120, then change notifications 150*a*, 150*b*, 150*c*, through 150*n* may be sent to read-only nodes, including a last change identifier 152. The response to a read request may depend on the determination of the consistent state of the database, which may be based on change notifications that are received and include a last change identifier, such as last change identifiers 142 and 152. Read request 170, for example, may be received after last change identifier 142, but before last change identifier 152. In response, read-only nodes 120 may present a view of the database including system transaction 140, as indicated at 172, and not system transaction 150—even though a change notification, change notification 150*a*, describing system transaction 150 has already been received at read-only nodes 120. However, a later read request 180, may receive a response that presents a view of the database including system transaction 150, as indicated at 182, as last change identifier 152 has previously been received. As illustrated in FIG. 1, a consistent view of the database may presented in response to read requests based, at least in part, on the change notifications that are identified as the last change to be applied in order to complete a system transaction.

The specification first describes an example network-based database service that includes the disclosed read-only nodes. Included in the description of the example network-based database service are various aspects of the example network-based database service, such as a database engine, read-only nodes, and a separate distributed database storage service. The specification then describes flowcharts of various embodiments of methods for efficiently replicating system transactions for read-only nodes of a distributed database. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single primary node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because redo logs and not modified data pages are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time. Moreover, communications (e.g., a change notification, such as a cache invalidation request) sent from a primary node of the database tier to read-only nodes of the database tier may be asynchronous as well.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Note that the storage service illustrated and described in FIGS. 2-6 is simply an example. Other storage services that are coupled to the database engine and read-only nodes may also be used in various embodiments.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the aforementioned layers), and then adding glue logic to stitch them together. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a read-write node server, which may also be referred to herein as a read-write node server, that receives read and/or write requests from various client programs (e.g., applications) and/or subscribers (users), then parses them and develops an execution plan to carry out the associated database operation(s). For example, the read-write node may develop the series of steps necessary to obtain results for complex queries and joins. In some embodiments, the read-write node may manage communications between the database tier of the database system and clients/subscribers, as well as communications between the database tier and a separate distributed database-optimized storage system.

In some embodiments, the read-write node may be responsible for receiving SQL requests from end clients through a JDBC or ODBC interface and for performing SQL processing and transaction management (which may include locking) locally. However, rather than generating data pages locally, the read-write node (or various components thereof) may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the read-write node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the database tier may support the use of synchronous or asynchronous read-only nodes (sometimes referred to as read-replicas) in the system, e.g., read-only copies of data on different nodes of the database tier to which read requests can be routed. In such embodiments, if the read-write node for a given database table receives a read request directed to a particular data page, it may route the request to any one (or a particular one) of these read-only copies. Or, in some embodiments, a client read request may be received directly by a read-only node (from a client), without first going through the read-write node. In some embodiments, the client-side driver in the read-write node may be configured to notify these other read-only nodes (e.g., to a client-side driver of those other nodes) about changes by sending change notifications (e.g., changes to system metadata, such as a data dictionary or active transactions list, and or updates and/or invalidations to data pages, such as those data pages cached locally at the read-only node). In response, the read-only node may be configured to perform the notified changes (e.g., such as by invalidating their caches for a specific page or record of the cache or the whole cache, by modifying internal data structures, and/or by updating or modifying values stored within data pages in the database cache maintained at the read-only node).

Groups of changes may be associated with a particular system transaction (sometimes referred to as a mini-transaction), such as described below in greater detail with regard to FIG. 6. One of the change notifications sent to the read-only node may be notified as the last change to be applied for a respective system transaction. For reads requests, the read-only nodes may be configured to determine a consistent state of the database to present when servicing a read request, such as based on the identified last change of a system transaction which has been applied. The read request may then be serviced according to the determined consistent state of the database to be presented. For example, in some embodiments, data pages in a database cache on the read-only node may have been invalidated, and the consistent state of the database to be presented may cause the read-only node to retrieve updated copies of updated data pages (or log records of changes to those pages to apply them to the cache) from the storage layer. In some embodiments, the read-only nodes may be configured to receive an indication (e.g., a manifest) of data pages stored in the cache of the database engine head node, which may include pages that are hot on the read and write side. The read-only nodes may be configured to retrieve the hot pages from the storage layer, which may help prepare a read-only node to convert to a read-write node (e.g., if the read-write node fails). In addition, the read-only node may be configured to update an in-memory data structure (e.g., a transaction table) to determine which redo and undo records were inflight (e.g., not received or known by the read-only node) at the time of the read-write node failure. As a result, the converted read-only node may already have a warm cache (e.g., the cache may not have to be rebuilt from scratch) as part of the conversion process.

In some embodiments, the client-side driver(s) running on the read-write node and/or the read-only nodes may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (of the read-write node and/or read-only nodes) may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the read-write node cache and/or the by the cache of a particular read-only node. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
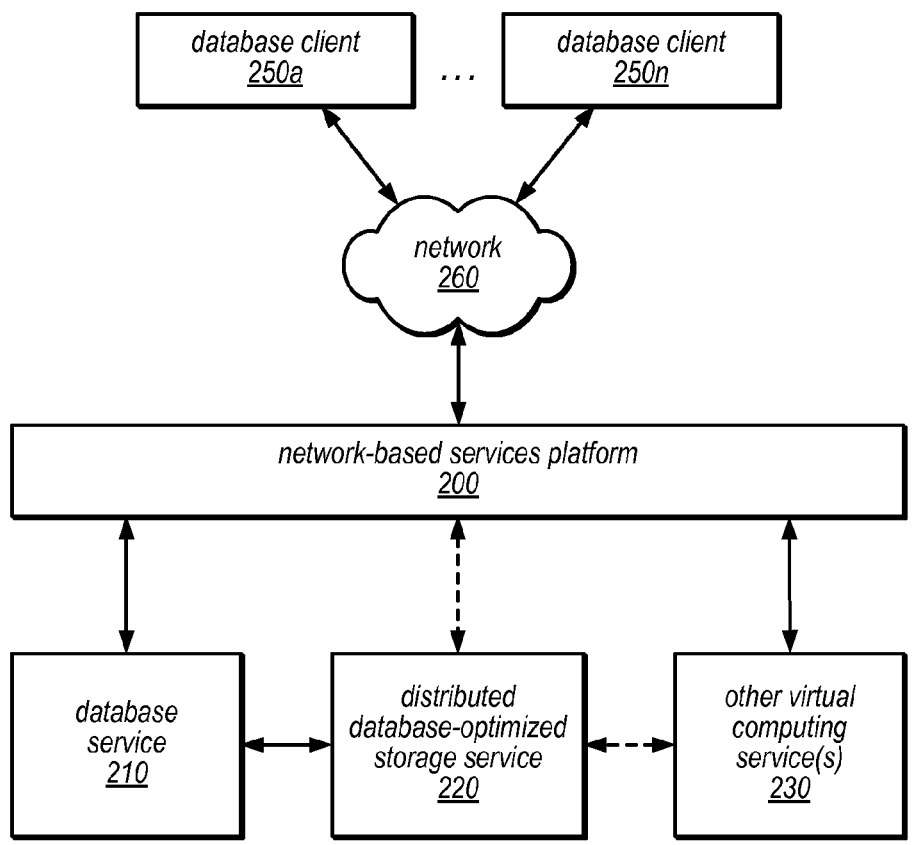
FIG. 2 is a block diagram illustrating a service system architecture that may be configured to implement a network-based database service that implements read-only nodes, according to some embodiments.

One embodiment of a service system architecture that may be configured to implement a web services-based database service is illustrated in FIG. 2. In the illustrated embodiment, a number of clients (shown as database clients 250a-250n) may be configured to interact with a network-based services platform 200 via a network 260. Network-based services platform 200 may be configured to interface with one or more instances of a database service 210 (an instance may include a read-write node and a number of read-only nodes), a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with web services platform 200. In some embodiments, client 250 may be configured to generate network-based services requests according to a Representational State Transfer (REST)-style web services architecture, a document- or message-based network-based services architecture, or another suitable network-based services architecture.

In some embodiments, a client 250 (e.g., a database service client) may be configured to provide access to network-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to network-based services platform 200 may be coordinated by client 250 and the operating system or file system on behalf of applications executing within the operating system environment.

Clients 250 may convey network-based services requests to and receive responses from network-based services platform 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed database-optimized storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, network-based service platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Network-based services platform 200 may also implement financial accounting and billing systems, or may maintain a database of usage data that may be queried and processed by external systems for reporting and billing of client usage activity. In certain embodiments, network-based services platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, network-based services platform 200 may also implement user authentication and access control procedures. For example, for a given network-based services request to access a particular database table, network-based services platform 200 may be configured to ascertain whether the client 250 associated with the request is authorized to access the particular database table. Network-based services platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, distributed database-optimized storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass network-based services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through network-based services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
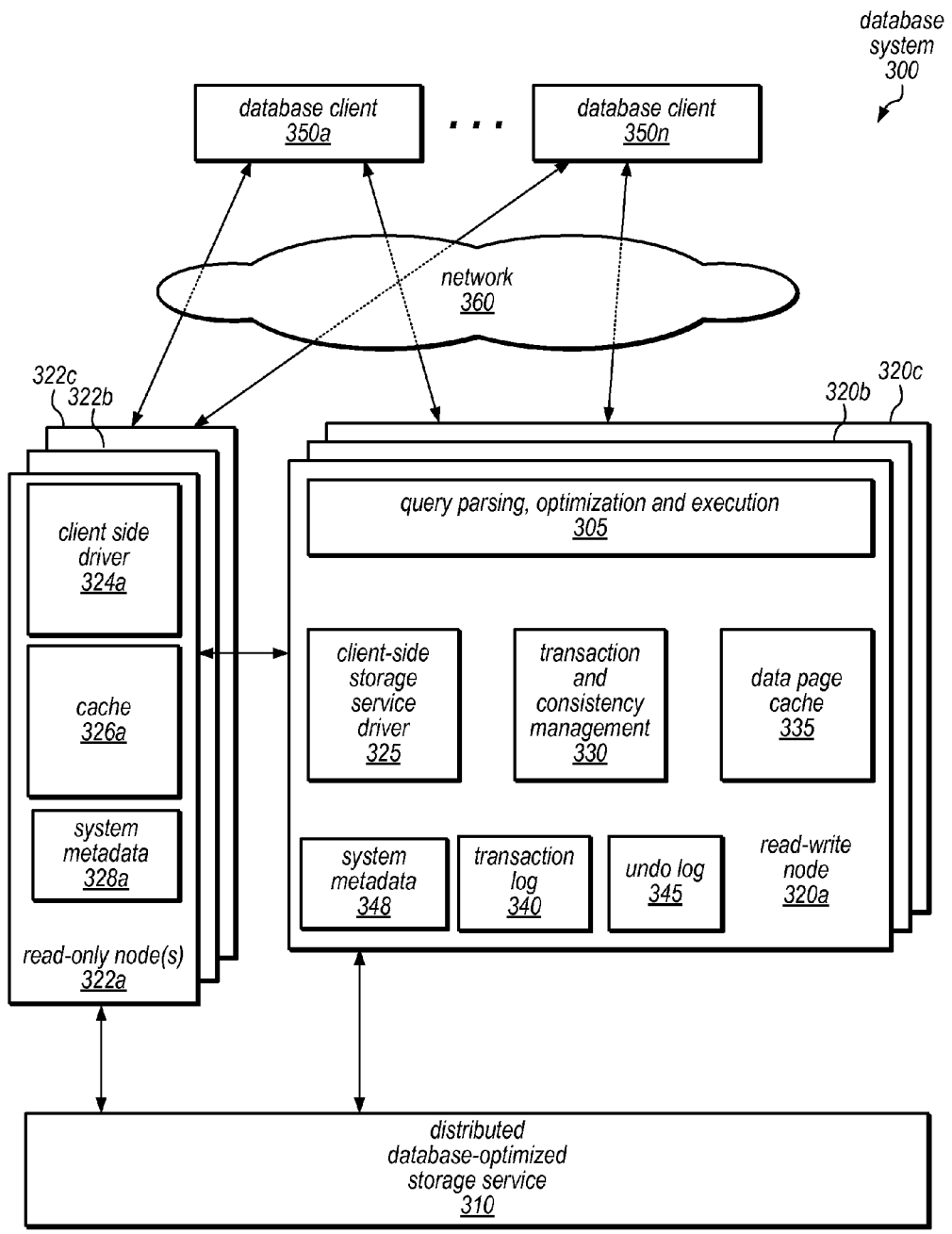
FIG. 3 is a block diagram illustrating various components of a database system configured to use the disclosed read-only nodes, according to some embodiments.

FIG. 3 is a block diagram illustrating various components of a database system that includes a read-write node, read-only nodes, and a separate distributed database storage service, according to one embodiment. In this example, database system 300 includes a respective database read-write node 320 and a plurality of read-only nodes 322*a*, 322*b*, and 322*c* for each of several database tables and a distributed database-optimized storage service 310 (which may or may not be visible to the clients of the database system, shown as database clients 350*a*-350*n*). As illustrated in this example, one or more of database clients 350*a*-350*n* may access a read-write node 320 (e.g., read-write node 320*a*, read-write node 320*b*, or read-write node 320*c*, each of which is a component of a respective database instance) and/or a read-only node (e.g., read-only node 322*a*, 322*b*, or 322*c*) via network 360 (e.g., these components may be network-addressable and accessible to the database clients 350*a*-350*n*). Note that any number of read-only nodes may be associated with a particular database instance but for ease of illustration and explanation, three read-only nodes are shown in FIG. 3. Distributed database-optimized storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, and/or space management operations in a manner that is invisible to storage clients 350a-350n.

As previously noted, each database instance may include a single read-write node 320 that receives requests from various client programs (e.g., applications) and/or subscribers (users), then parses them, optimizes them, and develops an execution plan to carry out the associated database operation(s). Also as previously noted, each read-only node may receive read requests (e.g., from various client programs, subscribers, and/or from the read-only node), and may similarly parse such requests, optimize them, and develop an execution plan to carry out the read (e.g., SELECT). In the example illustrated in FIG. 3, a query parsing, optimization, and execution component 305 of read-write node 320a may perform these functions for queries that are received from database client 350a and that target the database instance of which read-write node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, read-write node 320a may also include a client-side storage service driver 325, which may route read requests and/or change notifications (e.g., redo log records) to a read-only node and/or various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, read-write node 320a includes data page cache 335, in which data pages that were recently accessed (read and/or write) may be temporarily held. As illustrated in FIG. 3, read-write node 320a may also include transaction and consistency management component 330, which may be responsible for providing transactionality and consistency in the database instance of which read-write node 320a is a component. For example, this component may be responsible for ensuring the Atomicity, Consistency, and Isolation properties of the database instance and the transactions that are directed that the database instance. As illustrated in FIG. 3, read-write node 320a may also include transaction log 340 and undo log 345, which may be employed by transaction and consistency management component 330 to track the status of various transactions and roll back any locally cached results of transactions that do not commit. Read-write node 320a may also maintain system metadata 348, such as one or more in-memory data structures, such as a data dictionary, active transactions information, or any other information for describing the data structure or schema of the database. Other components, such as query parsing, optimization, and execution 305, transaction and consistency management 330, and client-side storage service driver 325, may access system metadata 348 in order to process queries, generate change notification messages, and/or any other system functions.

Note that each of the other read-write nodes 320 illustrated in FIG. 3 (e.g., 320b and 320c) may include similar components and may perform similar functions for queries received by one or more of database clients 350a-350n and directed to the respective database instances of which it is a component.

In various embodiments, each of the read-only nodes 322a, 322b, and 322c may also include components similar to those of the read-write node and/or may be configured to include such components (e.g., upon conversion of a read-only to a read-write node to replace the old read-write node). As shown, each read-only node may include cache 326a and client side driver 324a. Client side driver 324a may be similar to client-side storage service driver 325 of the read-write node. Moreover, communication between the read-write node and the read-only nodes may be communication between client side driver 324a and client-side storage service driver 325. Cache 326a may be similar to data page cache 335 in that it may be configured to store recently accessed data pages. Note that data pages stored in the cache of one read-only node may be different than data pages stored in the cache of another read-only node which may also be different than data pages stored in data page cache 335. Moreover, the actual data stored for a data page in the cache of one read-only node may be different from the actual data stored for the same data page in the cache another read-only node and/or from the actual data for the same data page stored in data page cache 335.

In some embodiments, upon sending a redo log (or undo log) to the storage layer, client-side storage service driver 325 may also be configured to send one or more change notifications to client-side driver 324a at read-only node(s) 322a. Change notifications may be indicate various updates or changes made at read-write node. For example, inserting a new record in a database table may include many different changes, such as allocating new space in a data page for the new record, updating the indexing structure (e.g., a b-tree) of the database, storing the new data values for the record, and updating system metadata (e.g., the data dictionary) to include information about the new record may each have one or more change notifications to describe the performance of these changes. Different change notification messages may indicate different types of changes that are performed at a read-write node. Change notifications may include invalidation messages, which may indicate one or more data pages that may have modified data values. Change notifications may also include new data values, changes, or pages themselves for modified/updated data pages. Change notifications may also include changes to system metadata, such as data that indicates the definition and/or layout of data in distributed storage service 310 (e.g., data dictionary), or in-flight transaction information, such as the transaction state and/or active transaction list, for transactions performed at the read-write node.

Change notifications may be associated with a system transaction, in at least some embodiments. Multiple system transactions may be performed to complete a user update or request. For a given system transaction, client-side storage service driver 325 may be configured to identify a particular one of the change notifications as the last change to be applied of the given system transaction. A special identifier, number, or other marker may be included in the change notification to identify the last change, which client side driver 324a may be configured to identify. When responding to read requests, read-only node(s) 322a may be configured to determine the consistent state of the database to present when servicing the read request based, at least in part, on the identified last change of system transactions. For example, as illustrated above in FIG. 1, a read request may be serviced with a view of the database including transactions where the last change notification of the transaction has been received. Change notifications may include changes to system metadata 328a or data pages in cache 326a. Client-side driver 324 and/or other components of read-only nodes 322a may access system metadata in order to perform various functions, such as servicing read requests.

In various embodiments, one of read-only nodes 322a, 322b, or 322c may be converted into a new read-write node (e.g., if the read-write node 320a fails). To help prepare for such a conversion, one or more of the read-only nodes may be configured to receive, from the read-write node (while still active), an indication of the data pages stored in the read-write node's cache. The indication may be a manifest of data pages that are hot on the read and write side. The read-only nodes may then retrieve versions of those data pages, for example, from distributed database-optimized storage service 310, and may store those retrieved data pages in cache. The manifest/indication may be sent periodically (e.g., hourly, daily, etc.) or upon certain events (e.g., every read/write, every 10 read/writes, upon some internal read-write node logic indicating potential read-write node failover, etc.). As such, the read-only nodes' caches may be a warmer cache in the event of a conversion to read-write node. In one embodiment, network-based service platform 200 may determine that a read-write node has failed and select which read-only node to convert. In other embodiments, the first read-only node to detect the read-write node's failure may determine that it should convert into a read-write node or the read-only node may vote for which read-only node to convert. In yet another embodiment, a given one of the read-only nodes may be preselected as the first option to convert into a read-write node if the previous read-write node fails. Other ways to determine which read-only node to convert also exist. In some embodiments, no loss of data may occur in the conversion process because the read-only node is connected to the same data storage as written to by the read-write node, and therefore has access to all of its data. Moreover, sending the change notifications between the read-write node and the read-only nodes may, in various embodiments, allow the read-only nodes to provide consistent views of the database with little or no lag time to catch-up to changes already performed at the read-write node. This is in contrast to a system in which the read-only nodes utilize a different data storage that is separate than that written to by the read-write node. In such a system using different data storage, data loss may occur if the replication was performed asynchronously or poor performance may occur if the replication was performed synchronously.

Moreover, there may exist log records (e.g., redo and/or undo) corresponding to transactions that were inflight to the read-only nodes from the previous read-write node that were unknown (e.g., not seen, not received) to the read-only nodes but were received by distributed database-optimized storage service 310. Therefore, even if the manifest helps keep the read replicas' respective caches somewhat up to date, they may nevertheless still be stale in some respect. Therefore, in one embodiment, the read-only node that is converted into the new read-write node may (before or after conversion) be configured to determine which was the last log record (e.g., as identified by a monotonically increasing identifier, such as a log sequence number (LSN)) that the read-only node was aware of. The read-only node may then be configured to request which data records having corresponding log records later than the last log record have changed and invalidate those in cache. The read-only node may also be configured to request the actual log records and/or the data records to update its own cache so it is no longer invalid/stale. Further, the read-only nodes may be configured to maintain a transaction table of the inflight transactions. The read-only nodes may be configured to request distributed database-optimized storage service 310 to send the inflight transactions to the read-only nodes and then update in memory structures (e.g., the transaction table) according to the inflight transactions. Alternatively, as noted above, change notifications may include changes to system metadata which indicate the inflight transactions for the in-memory structures. The converted read-only node may be configured to determine that a particular transaction of the inflight transactions was related to the failure of the read-write node (e.g., caused it to crash) and roll back a change of that transaction (e.g., not apply it to its own cache and/or instruct the storage layer to remove its application at the storage layer).

In some embodiments, the distributed database-optimized storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Log Sequence Number, which may be an identifier that uses monotonically increasing values to denote an ordering. For example LSN 1 is earlier than LSN 3, which is earlier than LSN 6. Note that each number in sequence need not be used. For example, LSNs 1, 2, 3, 4, and 6 may exist but not LSN 5 in some embodiments. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
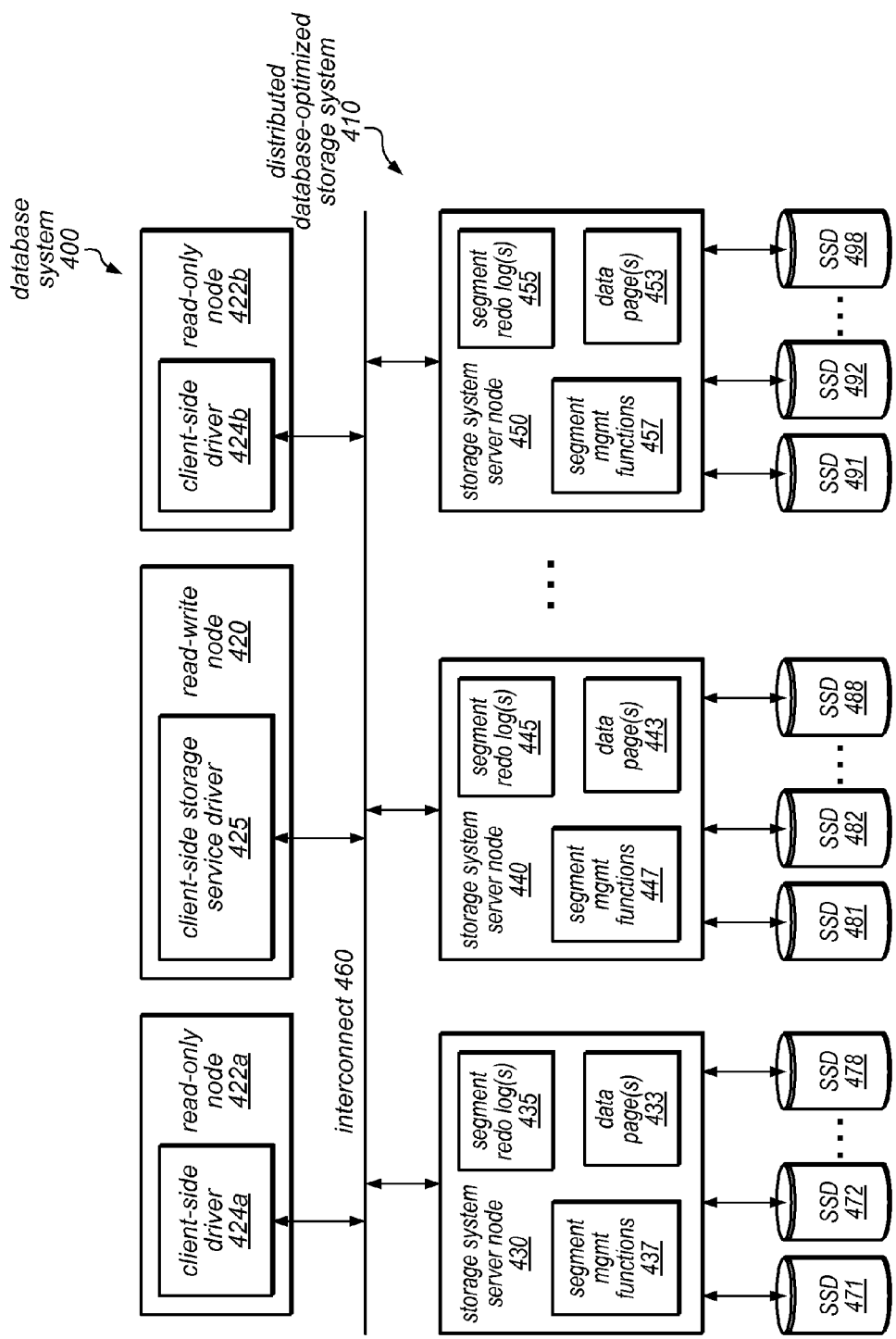
FIG. 4 is a block diagram illustrating a distributed database-optimized storage system configured to use the disclosed read-only nodes, according to some embodiments.

One embodiment of a distributed database-optimized storage system is illustrated by the block diagram in FIG. 4. In this example, a database system 400 includes a distributed database-optimized storage system 410, which communicates with a read-write node 420, read-only node 422a, and read-only node 422b (only two read-only nodes are shown for ease of illustration/explanation) over interconnect 460. As in the example illustrated in FIG. 3, read-write node 420 may include a client-side storage service driver 425 and read-only nodes 422a and 422b may each include a client-side driver 424a and 424b, respectively. In this example, distributed database-optimized storage system 410 includes multiple storage system server nodes (including those shown as 430, 440, and 450), each of which includes storage for data pages, redo logs for the segment(s) it stores, system metadata for read-write node 420 (e.g., data dictionary data, transaction table data etc.) and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware.

Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed database-optimized storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Figure 5:
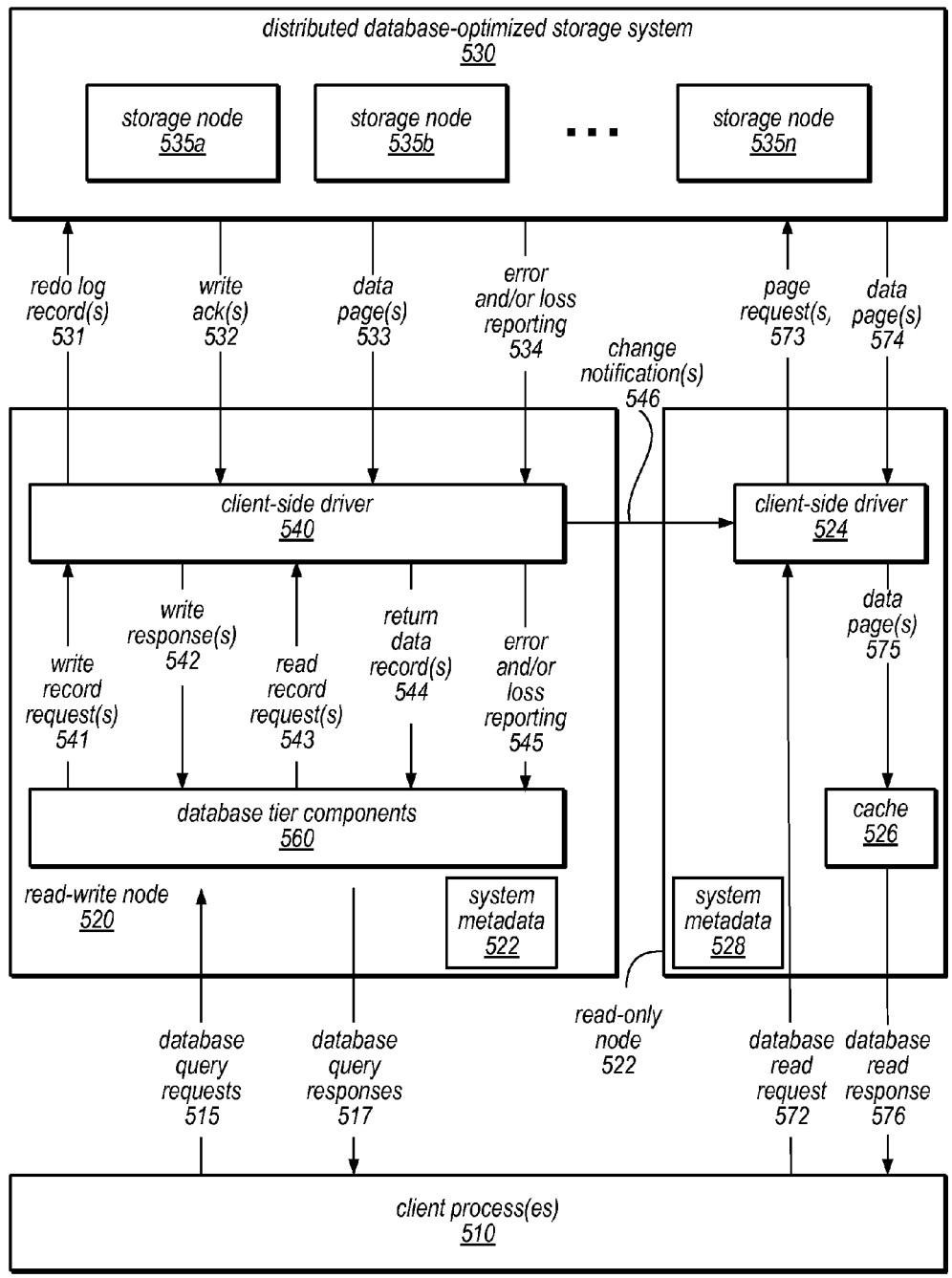
FIG. 5 is a block diagram illustrating the use of a separate distributed database-optimized storage system in a database system configured to use the disclosed read-only nodes, according to one embodiment.

FIG. 5 is a block diagram illustrating the use of a separate distributed database-optimized storage system in a database system, according to one embodiment. In this example, one or more client processes 510 may store data to one or more database tables maintained by a database system that includes a database engine 520 and a distributed database-optimized storage system 530. In the example illustrated in FIG. 5, database engine 520 includes database tier components 560 and client-side driver 540 (which serves as the interface between distributed database-optimized storage system 530, database tier components 560, and read-only node 522). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed database-optimized storage system 530. In this example, client-side driver 540 may generate one or more redo log records 531 corresponding to each write record request 541, and may send them to specific ones of the storage nodes 535 of distributed database-optimized storage system 530. In some embodiments, for write requests, client-side driver 540 may send change notifications 546 (e.g., a notification of changes to data pages, such as the new data values themselves as indicated by the one or more redo log records 531 or cache invalidation messages, and/or changes to system metadata 522, such as data structures that indicate the layout and/or definition of the database and/or in-flight transaction data, such as the states of and entries of active transactions at read-write node 520) to client-side driver 524 of read-only node 522, which may in turn apply the changes, such as to cache 526 and system metadata 528. FIG. 6, discussed below, provides further description of change notifications 546. Distributed database-optimized storage system 530 may return a corresponding write acknowledgement 532 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to clients-side driver 540 for subsequent routing to distributed database-optimized storage system 530. In this example, client-side driver 540 may send these requests to specific ones of the storage nodes 535 of distributed database-optimized storage system 530, and distributed database-optimized storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517. Note that certain read and write requests may be made to a cache (e.g., data page cache 335) of database engine, in addition to, or instead of being made to distributed database-optimized storage system 530. As part of parsed and optimizing certain read requests, some, or all, of the read query plan may be passed to read-only node 522 for performing the read.

In some embodiments, various error and/or data loss messages 534 may be sent from distributed database-optimized storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, client process(es) 510 may submit database read request 572 directly to read-only node 522 to query the database. For a request for non-stale cached data, read-only node may retrieve the requested data from cache 526 and return it to client process(es) as database read response 576. For a request for a data record that is present in cache 526 as stale data or for a data record that is not present in cache 526, client-side driver 524 may send page request(s) 573 to distributed database-optimized storage system 530 and the requested data page(s) 574 may be returned to read-only node 522 and then provided to client process(es) 510 as database read response 576. In one embodiment, data page(s) 574 may be routed through client-side driver 524 of read-only node 522 and the data page(s) may be stored in cache 526 and replace the stale cached data or replace some other data that is determined as cold data (e.g., is accessed less frequently than other cached data).

In various embodiments, read-only node 522 may be converted into a read-write node/database engine. In doing so, the converted read-only node may be configured to include all of the components shown in database engine 520, and others not shown in FIG. 5 (e.g., data page cache 335, transaction and consistency management 330, etc.). To help prepare for such a conversion, database engine 520 (while still the primary node) may send an indication (not shown in FIG. 5 but may be sent from client-side driver 540 to client-side driver 524) of the data pages stored in the database engine's cache (e.g., data page cache 335) to read-only node 522. As described herein, the indication may be a manifest of data pages that are hot on the read and write side (e.g., most actively read and written). Read-only node 522 may then retrieve versions of those data pages, for example, from distributed database-optimized storage service 530, and may store those retrieved data pages in cache. The manifest/indication may be sent periodically (e.g., hourly, daily, etc.) or upon certain events (e.g., every read/write, every 10 read/writes, upon some internal primary node logic indicating potential primary node failover, etc.). As such, cache 526 of read-only node 522 may be warmer than it was before, which may facilitate a quicker recovery and conversion in the event of a failure to the read-write node.

In various embodiments, as described herein, there may exist log records (e.g., redo and/or undo) corresponding to transactions (e.g., writes) that were inflight to read-only node 522 from the previous read-write node, database engine 520, that were unknown (e.g., not seen, not received) to read-only node 522 but were received by distributed database-optimized storage service 530. Therefore, even if the manifest helps keep cache 526 somewhat up to date, cache 526 may nevertheless still include some stale entries. Therefore, in one embodiment, read-only node 522 that is converted into the new primary node may (before or after conversion) may determine which was the last log record (e.g., as identified by a monotonically increasing identifier, such as an LSN) that read-only node 522 received. Read-only node 522 may then invalidate data in cache 526 that corresponds to log records having respective identifiers later than the determined last log record that changed. Read-only node may request (e.g., from distributed database-optimized storage service 530) the actual log records and/or the data records to update cache 526 so that it no longer is stale. Additionally, read-only node 522 may maintain an in-memory data structure (e.g., transaction table) of the inflight transactions. Read-only node may request the inflight transactions from distributed database-optimized storage service 530 and then update the in-memory structure with the inflight transactions. Alternatively, as noted above, change notifications 546 may include the inflight-transactions, which may updated in the in-memory structure on read-only node 522 as they are received. Thus, in the event of a conversion to a read-write node, read-only node 522 may quickly access a transaction table without requesting, receiving, and reconstructing (which in some embodiments may be costly) data for the in-memory structure from distributed database-optimized storage system 530. In one embodiment, the converted read-only node may then determine that a particular transaction of the inflight transactions was related to the failure of the primary node (e.g., caused it to crash) and roll back a change of that transaction (e.g., not apply it).

Note that in various embodiments, the API calls and responses between database engine 520 and distributed database-optimized storage system 530 (e.g., APIs 531-534) and/or the API calls and responses between client-side driver 540 and database tier components 560 (e.g., APIs 541-545) and/or API calls and responses between read-only node 522 and distributed database-optimized storage system 530 (e.g., APIs 573-574) and/or API calls and responses between client-side driver 524 and cache 526 (e.g., APIs 575 and 547) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed database-optimized storage system 530.

As illustrated above in FIG. 5, write requests (or other updates) received for a database may be performed by a read-write node, with change notifications 546 being sent to one or more read-only nodes 522. In various embodiments, write requests may be part of larger updates to a database (e.g., increase values for every record in a column of a database table by 1). In many embodiments, change notifications 546 may be streamed to read-only nodes 522 as read-write node 520 is performing the various changes of the update. By asynchronously streaming change notifications, read-only node 522 may perform the indicated changes as they are received without waiting to perform changes in a short period of time (e.g., when a read request is received). In this way, read-only nodes may catch-up to changes made at read-write node 520 with little or no lag time. FIG. 6 is a block diagram illustrating a change notification stream between a read-write node and read-only nodes, according to some embodiments.

Figure 7:
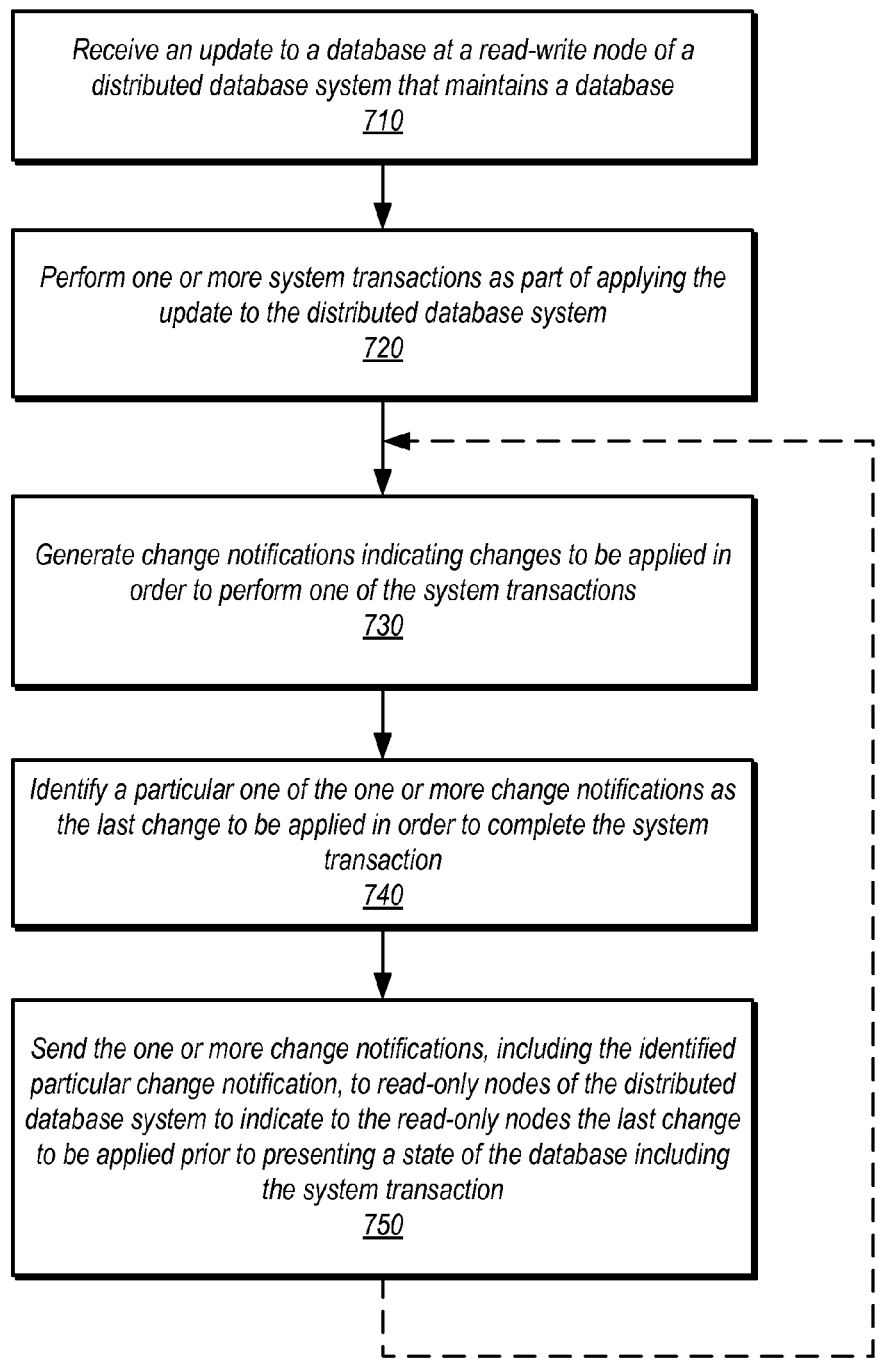
FIG. 7 is a high-level flowchart illustrating a method of efficiently replicating system transactions for read-only nodes of distributed database system, according to some embodiments.

Change notifications stream 620 may include multiple change notifications sent from read-write node client side driver 540 to read-only node client side driver 524. For example, an update 610, such as a write request, may be received at read-write node 520. Change notification messages 620 corresponding to the write request may be generated and sent to read-only node client-side driver 524. Different change notifications may be associated with or correspond to a system transaction that is used to perform the update 610. In this example, system transactions 630*a* through 630*n* are performed, with each system transaction corresponding to different change notifications sent to read-only node client-side driver 524. FIG. 7, described in further detail below, discusses various methods and techniques for generating and sending change notifications to a read-only node.

Change notifications 620 may be formatted to indicate different changes performed at read-write node 520. For example, in some embodiments, change notifications may indicate changes applied to data stored in data pages. Data pages, as noted elsewhere, may store both user data and data for system. Changes to data pages may be indicated using redo log records, which may describe a new value for a particular range of data or a method to modify a previously stored data page to generate the new value for a data page (e.g., increase the value by 1). A change may, in various embodiments, be applied to a sub-range of bytes persisted in a data page, without changing other bytes in the data page. Changes may also be applied to the bytes of data stored for the entire data page. As illustrated in FIG. 6, a data page change, such as data page change 632*a*, 632*b*, 632*n*, 642*a*, 642*b*, and 642*n*, may be included in a change notification, such as by including a redo log record or other instruction or indicator which may allow read-only node 522 to apply/perform the indicated change to the data page. In various embodiments, the change may be applied to a copy or version of the indicated data page maintained in a data page cache, such as data page cache 335 described above with regard to FIG. 3, at read-only node 522. Also included with data page changes in change notifications may be a sequence number or identifier that identifies an ordering or sequence of changes applied to data pages, such as LSN 634*a*, 634*b*, 644*a*, and 644*b*.

Change notifications 620 for data page changes may, in some embodiments, indicate that a data page has been changed without indicating the new data page value. Instead, the change notification may be indicated as invalid. For example, if data pages are maintained in a data page cache at read-only node 522 for servicing read requests, the change notification may be a data page cache invalidation indication. The cache invalidation indication may indicate that the cache record (copy of a data page) corresponding to a particular one or more data pages is. For a subsequently received read request to read the data corresponding to the stale cached data, the read-only node may request an updated version of the data (e.g., in the form of one or more redo/undo log records, a coalesced log record, or the actual data page) from distributed database-optimized storage system 530. In some embodiments, the read-only node may then update its cache with the current version of the data record and remove/reset the invalidation indication for that data.

Change notifications 620 may also indicate changes to system metadata. System metadata may generally be any system data used to describe the data, structure or schema, and/or state of the database system. For example, in various embodiments system metadata may describe the layout and definition of data maintained for a database as defined in a schema or structure for the database. A data dictionary, for instance, may describe the organization, content, conventions, schemes, or any other information related to the data in database. The data dictionary itself, or the information contained within the data dictionary may be considered system metadata. Additionally, system metadata may, in various embodiments describe the current (or previous) state or performance of the database. A transaction table, for example, may store a list of active transactions being performed at the database. Various information as to the state of each transaction ("received," "paused," "in progress," "complete," "fail," etc.) may be maintained. Thus, a transaction table and/or the information maintained as part of the transaction table may also be considered system metadata.

In various embodiments, system metadata may be maintained in in-memory data structures, such as in system memory 1020 described below with regard to FIG. 9. These in-memory data structures may be accessible to a read-write node, such as read-write node 520 when performing read and write operations. For instance, read-write node 520 may maintain a data dictionary and a transaction table structure in memory. In-memory data structures maintaining system metadata may be used in order to process updates (e.g., writes) and read requests. In one such example, a data dictionary, or some other mapping information, may be used to process requests by resolving table names, column names, row names, or other location information for a database table in order to correctly perform the read or write request at the one or more locations specified in the request. In response to receiving updates, such as write requests, read-write node 520 may make changes to system metadata. If, for instance, a new record or column is created for a database table, a new information may be added to a data dictionary (or other similar in-memory data structure). Upon receipt of a subsequent access request for the new record or column, the data dictionary may then accurately resolve the access request. Changes to system metadata may be sometimes referred to as maintaining system metadata. System metadata maintenance may be made, in various embodiments, in response to performing updates and/or other changes in the state of the database.

Figure 6:
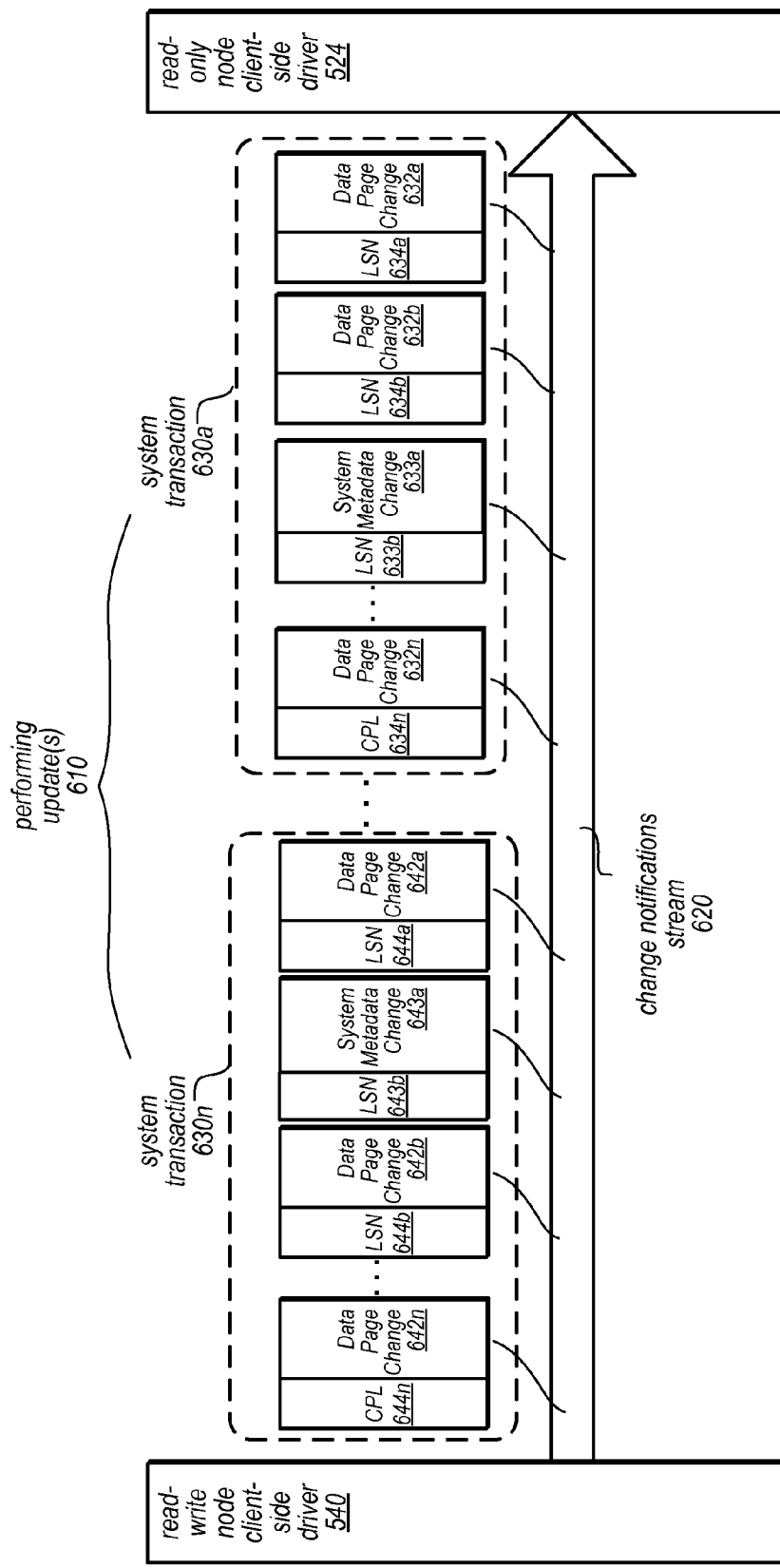
FIG. 6 is a block diagram illustrating a change notification stream between a read-write node and read-only nodes, according to some embodiments.

As illustrated in FIG. 6, some change notifications in the change notifications stream 620 may indicate changes to system metadata, such as system metadata change 633a and system metadata change 643a, each with respective LSNs 634b and 644b. These change notifications may be sent as part of the change notification stream from read-write node client-side driver 540 to read-only node client side driver 524. Read-only node 522 may then apply the indicated changes to similar in-memory data structures maintained at read-only node 522 for processing read requests. Thus, if a change notification indicates that a new column has been added to a database table, read-only node 522 may update a data dictionary (or similar mapping information) in order to reflect the additional column for the particular database table. By asynchronously updating in-memory data structures on read-only node 522 to reflect updates performed at read-write node 520, read-only node 522 may more efficiently process read requests, without the processing resources necessary to infer changes to in-memory data structures either from other change notifications received, or from data received from distributed storage system 530, which has a storage optimized format for storing in-memory data structures that has a high processing cost to transform back into a format that may be maintained in the corresponding in-memory data structures at a read-only node. Although not illustrated in FIG. 6, system metadata change 633a and 643a may be sent separately from other data page changes (e.g., 642 and 642). A system metadata change may itself be associated by itself with a system transaction and, thus, may be designated as a CPL.

In at least some embodiments, a last change to be applied in a system transaction may be identified, such as by a sequence number, marker, or other identifier that a read-only node may be able to identify. For example, in some embodiments, as illustrated in FIG. 6, CPL 634n (Consistent Page LSN) provides a monotonically increasing sequence number, such as an LSN, which has been further modified, marked, or denoted in order to indicate to read-only node 522 that data page change 632n is the last change to be applied for system transaction 630a. In this way, read-only node 522 may determine a consistent state of the database when servicing a read request based, at least in part, on the identified last change to be applied. Consider the scenario illustrated in FIG. 6, where read-only node 522 may receive CPL 634n after receiving the sequence numbers 632a through 632n-1. Read-only node 522 may determine that a consistent state of the database is available when a system transaction is completed, such as when system transaction 630a is complete. Thus, for read-requests received after CPL 634n, read-only node 522 may include the applied changes indicated by change notifications prior to CPL when presenting a view of the database to service a read request received at read-only node 634.

As change notifications may be received and subsequently applied in a streaming fashion, (e.g., applied when received) at a read-only node, read requests may often be received while read-only node 522 has not yet received and applied all of the change notifications for a system transaction. In some embodiments, read-only node 522 may respond to read requests received before a complete system transaction by accessing a data page cache (such as data page cache 335 discussed above with regard to FIG. 3) for the requested data in order to service the query. If the cached data page for servicing the read request is (at the time of the read request) unmodified (i.e., not "dirty") by change notifications already received, then the data page may be utilized for servicing the query. For example, if a read request is received between when read-only client-side driver 524 receives data page change 632a and data page change 632b, then system transaction 630a is not yet complete. Read-only node 522 may access a data page cache in order to service the read-request and find that the data page change 632a has left the requested data page unmodified. Read-only node 522 may then use the copy of the data page in the data page cache in order to service the query. Alternatively, if a data page is modified ("dirty") in a data page cache by a change notification corresponding to an incomplete system transaction, read-only node 522 may request and receive a copy of the data page from database optimized storage system (as illustrated at 573 and 574 in FIG. 5) in order to service the query.

Many other different methods and techniques may be implemented for read-only node 522 to present a view of the database without change notifications corresponding to a system transaction, such as system transaction 630a, when read-requests are received prior to the complete application of a system transaction. For instance, in some embodiments, received and applied data page change notifications may be redo log records maintained in a redo log, allowing read-only node 522 to only apply those redo log records to a cached data page that are less than a determined consistent state of the database (e.g., a CPL). Therefore, the previous examples are not intended to be limiting as to other ways in which read requests may be serviced when received.

Please note that although different orderings of types of change notifications, such as different orderings for data page change notifications and system metadata change notifications, are illustrated, neither ordering is intended to be limiting as numerous orderings of change notifications sent to read-only nodes may be envisioned.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database table (e.g., to update a single data block by adding a record to that data block), one or more components of the primary node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the primary node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log, both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Various examples have been given above of a distributed database system configured to implement efficiently replicating system transactions for read-only nodes. While the different ones of the various components, modules, devices, nodes, or systems described above may be configured to replicate system transactions, various other different devices may also be configured to implement efficiently replicating system transactions for read-only nodes. FIG. 7 is a high-level flowchart illustrating a method of efficiently replicating system transactions for read-only nodes of distributed database system, according to some embodiments, which may be implemented by the example distributed database systems described above or other database systems that implement read-only nodes.

As indicated at 710, an update to a database may be received at a read-write node of a distributed database system that maintains a database, in various embodiments. A distributed database system may implement a read-write node that is configured to process read and write requests for data maintained by the distributed database system. An update may be, for example, a write request that specifies a modification (e.g., INSERT, UPDATE, DELETE, etc.) to a data record maintained by a database. As a simple example, the write request may specify to change data record A to value '2'.

In order to apply the received update, a read-write node may perform one or more system transactions, as indicated at 720. A system transaction may be one or more changes that are (from the perspective of a client/system/requestor) atomically performed at the read-write node. For example, if an update request is to insert a new record, then multiple different changes may be made, such as modifying a leaf node in a b-tree index structure, allocating the data in a data page to store the new record, updating a record count value for the database table in mapping information (e.g., a data dictionary). If the update is part of a larger user transaction, then a transaction table entry may also be made to record the existence of the user transaction that includes the update. All of these changes may be performed as part of a single system transaction. However, multiple system transactions may be performed in order to perform the received update (e.g., if the update is to change the value of several different records).

For each of the one or more system transactions, change notifications may be generated indicating the changes to be applied in order to perform each respective system transaction, as indicated at 730. In various embodiments, change notifications may indicate different changes. For example, in some embodiments change notifications may indicate changes to one or more data pages, such as the changes to a data page storing the particular record that is to be updated. New values for the changed data pages may be included in the change notification. A redo or other log record may, for instance, be included in order to indicate the new data value of the data page (which may include changes to a specific range of bytes in the data page without changing other portions of the data page). Alternatively, a data page change notification may simply indicate that one or more data pages (or particular locations, such as byte ranges, within the one or more data pages have been changed), resulting in the invalidation of any cached or local copies/versions of the data page. Change notifications may also be generated, in some embodiments, to indicate changes to system metadata at the read-write node. System metadata, as described above with regard to FIG. 6, may describe the data of a database, structure or schema of the database, such as the layout and/or definition of the data, and/or the state of the database, such as the state of various operations (e.g., user transactions) performed at the database.

Of these generated change notifications indicating the changes to be applied in order to perform the system transaction, a particular one may be identified as the last change to be applied in order to complete the system transaction, as indicated at 740. For example, in at least some embodiments, a marker or identifier may be included with the change notification, such as a CPL described above with regard to FIG. 6, that identifies to a read-only node that the change notification is the last change notification in stream of change notifications received at the read-only node to be applied for a system transaction. The change notifications may then be sent to a read-only node, as indicated at 750. Change notifications may, in some embodiments, be streamed to a read-only node, where the change notifications are sent as they are created. In some embodiments, change notifications may be sent in batches (e.g., using a boxcar method), although all change notifications associated with a system transaction need not be sent in a single batch. Elements 730 through 750 may be repeated (as illustrated by the dotted line in FIG. 7) for each system transaction performed to apply the updated received at 710.

Figure 8:
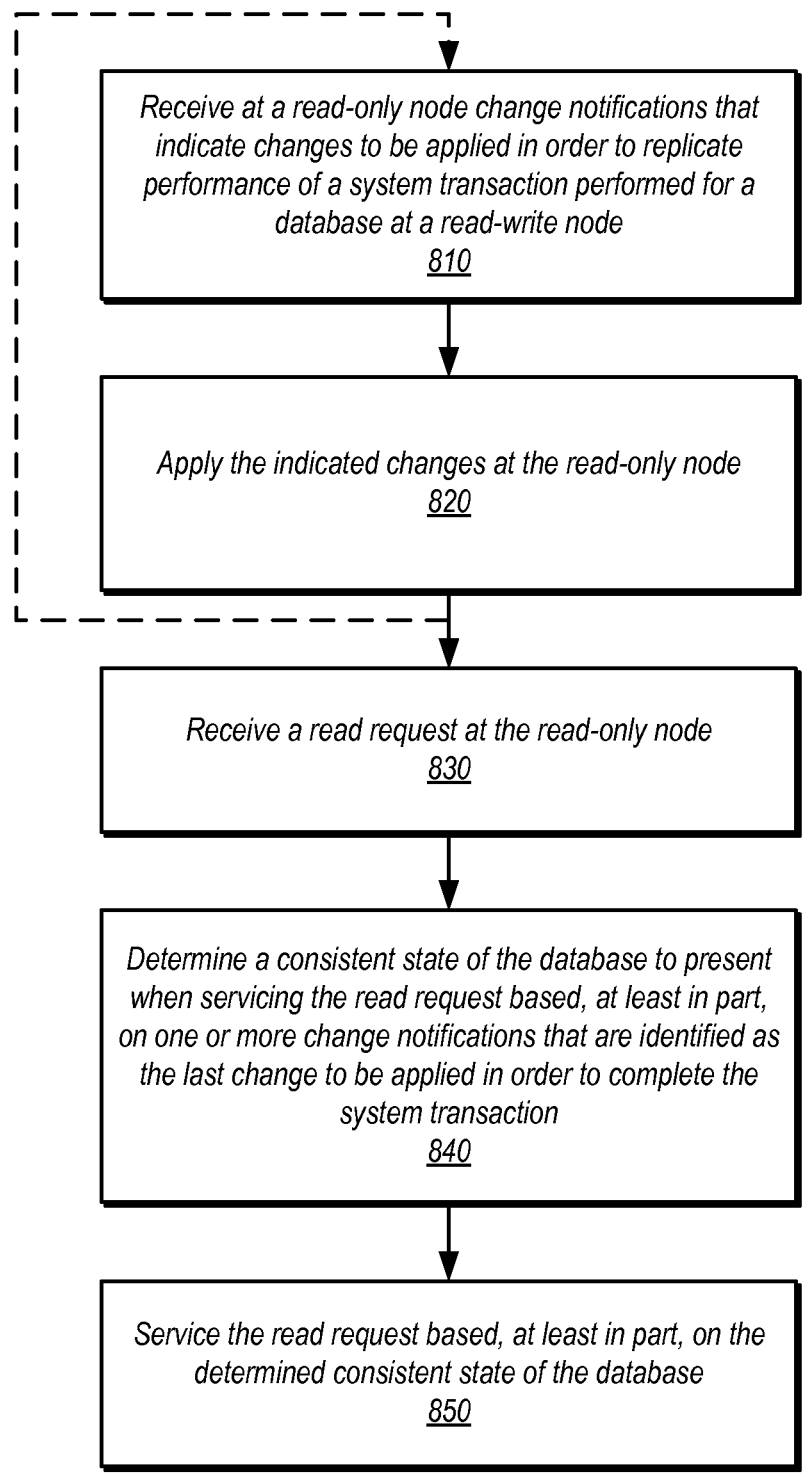
FIG. 8 is a high-level flowchart illustrating a method of processing read requests at a read-only node implementing efficient replication of system transactions, according to some embodiments.

In a distributed database system read-only nodes may be configured to process read requests for data maintained by the distributed database system. FIG. 8 is a high-level flowchart illustrating a method of processing read requests at a read-only node implementing efficient replication of system transactions, according to some embodiments. As indicated at 810, change notifications, such as the change notifications generated according to element 730 in FIG. 7, may be received at a read-only node in order to replicate performance of a system transaction performed for a database at a read-write node, in various embodiments. The indicated changes may be applied at the read-only node, as indicated at 820. For example, if a change notification indicates a new value for a data page(s) (or sub-range of bytes in the data page(s)), then a read-only node may apply the change to a copy or version of the data page maintained in a data page cache for servicing read requests at the read-only node (e.g., by a applying a redo log to the cached data page, or by storing the redo log to be applied to the data page). In another example, the change indication may be an invalidation indication, which may indicate one or more data pages that have been changed, and corresponding versions or copies of the data page in a data page cache maintained at the read-only node may be invalidated for use in servicing subsequent read requests. Change notifications may also indicate changes to system metadata, which read-only node may also apply to in-memory data structures maintained at the read-only node for process read requests. Subsequent read requests may then be processed using the updated in-memory data structures. In some embodiments, change notifications may be streamed to a read-only node, and a read-only node may apply the indicated changes as they are received. As change notifications may be streamed to a read-only node, the dotted line from 820 leading back to 810 illustrates that change notifications may be sent and applied continuously or periodically at a read-only node, prior to, during, or after receiving read requests.

Before, during, or after a read-only node receives and applies change notifications, a read request may be received at the read only node, as indicated at 830. In response to receiving the read request, a consistent state of the data base to present when servicing the read request may be determined, as indicated at 840. In various embodiments, determining a consistent state may be based, at least in part, on one or more change notifications identified as the last change to be applied as part of a system transaction. For example, if an identified change notification includes a monotonically increasing sequence identifier, such as a CPL discussed above with regard to FIG. 6, then the last received CPL may be identified as a consistent state, where all change notifications received prior to the consistent state are to be included when presenting a view of the database for servicing the read request at the read-only node. In various embodiments, these change notifications may be identified and subsequently included in a view of the database used to service the query. As indicated at 850, the read request may then be serviced based, at least in part, on the determined consistent state of the database.

The methods described herein (e.g., the methods of FIGS. 7-8) may, in various embodiments, be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 9:
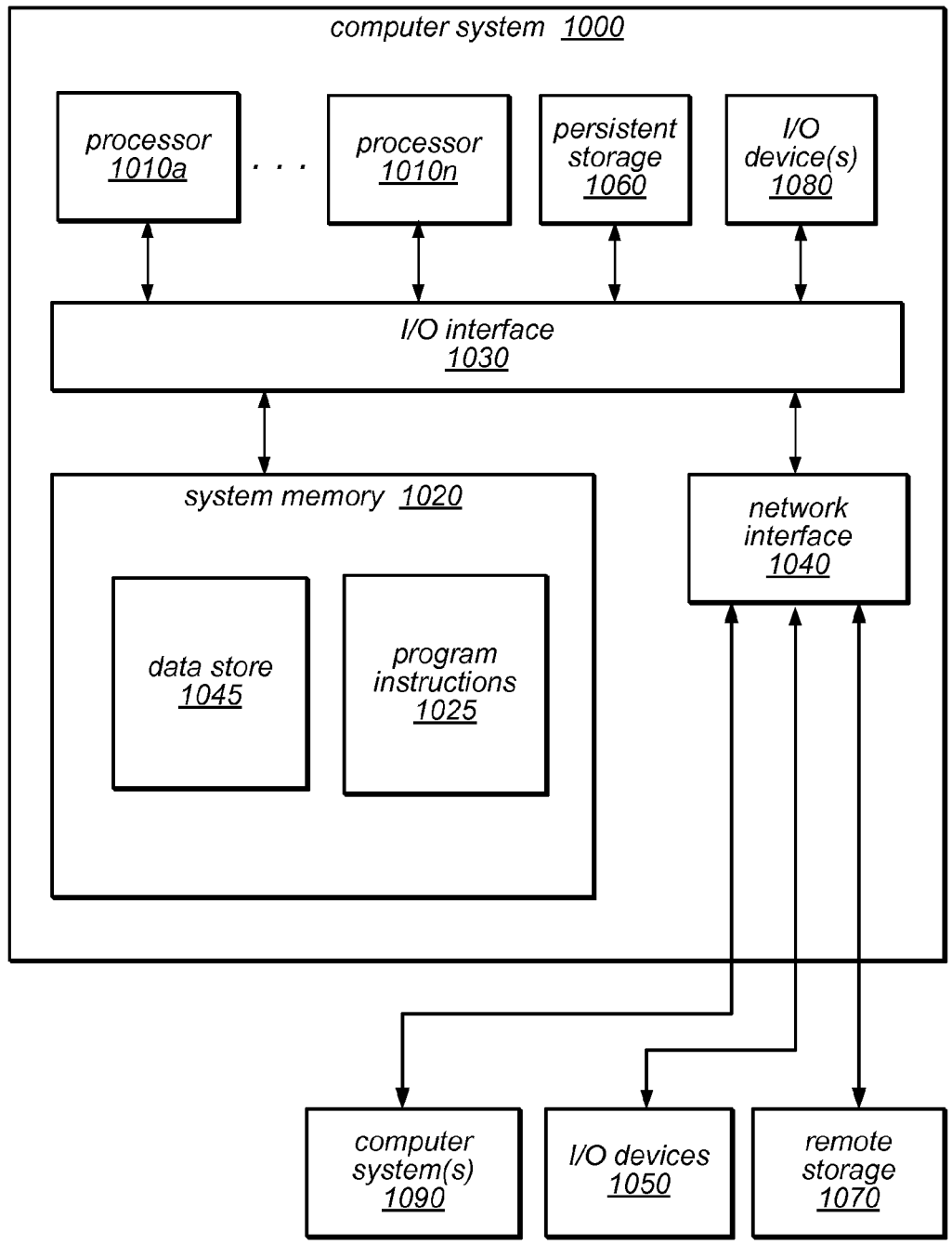
FIG. 9 is a block diagram illustrating an example computer system, according to various embodiments.

FIG. 9 is a block diagram illustrating a computer system configured to implement at least a portion of the database systems described herein, according to various embodiments. For example, computer system 1000 may be configured to implement a read-write (or master/leader/primary) node of a database tier, a read-only node (or read replica), or one of a plurality of storage nodes of a separate distributed database-optimized storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a read-write node of a database tier, one of a plurality of read-only nodes, or one of a plurality of storage nodes of a separate distributed database-optimized storage system that stores database tables and associated metadata on behalf of clients of the database tier, in various embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of nodes implemented by one or more computing devices, wherein the plurality of nodes implement a distributed database;
   wherein one or more nodes of the plurality of nodes implement one or more read-only nodes, wherein the one or more read-only nodes operate as read replicas to process read operations for the distributed database;
   wherein at least one other node, of the plurality of nodes implements a read-write node, wherein the read-write node processes read operations and write operations for the distributed database, and wherein the read-write node is configured to:
   receive an update to the distributed database;
   perform one or more system transactions as part of applying the update to the distributed database;
   for each of the one or more system transactions:
      generate a plurality of change notifications indicating changes to be applied in order to perform the system transaction;
      identify a particular one of the plurality of change notifications as the last change to be applied in order to complete the system transaction; and
      send the plurality of change notifications, including the identified particular change notification, to the one or more read-only nodes of the distributed database, wherein the particular change notification indicates to the one or more read-only nodes the last change to be applied prior to presenting a state of the database that includes the system transaction.

2. The system of claim 1, wherein each of the one or more read-only nodes is configured to:
   receive the plurality of change notifications; and
   apply the changes indicated in the plurality of change notifications.

3. The system of claim 2, wherein at least one of the plurality of change notifications comprises one or more changes to system metadata maintained by the read-write node, and wherein to apply the changes indicated in the plurality of change notifications, each of the one or more read-only nodes are further configured to modify system metadata for the read-only node to match the one or more indicated changes to the system metadata maintained at the read-write node.

4. The system of claim 2, wherein at least one of the plurality of change notifications comprises one or more changes to one or more data pages of a plurality of data pages maintaining data for the database at a distributed storage system, and wherein to apply the changes indicated in the plurality of change notifications, each of the one or more read-only nodes are further configured to invalidate a version of the one or more data pages maintained at the read-only node for servicing read requests.

5. The system of claim 2, wherein each of the one or more read-only nodes is further configured to:
   receive a read request at the read-only node;
   in response to receiving the read request:
      determine a consistent state of the database to present for servicing the read request based, at least in part, on the particular one of the plurality of change notifications identified as the last change to be applied in order to complete the system transaction; and
      service the read request based, at least in part, on the determined consistent state of the database.

6. A method, comprising:
   performing, by one or more computing devices implementing a read-write node of a plurality of database nodes, wherein the plurality of database nodes implement a distributed database system:
      generating a plurality of change notifications indicating changes to be applied in order to perform a system transaction at the read-write node, wherein the system transaction is one system transaction of one or more system transactions performed at the read-write node in order to apply an update received at the read-write node;
      identifying a particular one of the plurality of change notifications as the last change to be applied in order to complete the system transaction; and
      sending the plurality of change notifications, including the identified particular change notification, to one or more read-only nodes of the distributed database system, wherein the particular change notification indicates to the one or more read-only nodes of the distributed database system the last change to be applied prior to presenting a state of the database that includes the system transaction.

7. The method of claim 6, wherein at least one of the plurality of change notifications comprises one or more changes to a data page of a plurality of data pages maintaining data for the database at a data store.

8. The method of claim 7, wherein said generating the at least one change notification comprising one or more changes to the one or more data pages comprises generating a redo log record for each of the one or more changes to the one or more data pages.

9. The method of claim 6, wherein at least one of the plurality of change notifications comprises one or more changes to system metadata maintained by the read-write node, wherein the system metadata comprises:
   metadata describing a database schema maintained at a data store for the database; or
   metadata describing in-flight transactions.

10. The method of claim 6, wherein said identifying the particular one of the plurality of change notifications as the last change to be applied in order to complete the system transaction comprises including a monotonically increasing identifier in the particular change notification.

11. The method of claim 6, further comprising:
   performing, by one or more other computing devices implementing a read-only node of the one or more read-only nodes of the distributed database system:
      receiving the plurality of change notifications; and
      applying the changes indicated in the plurality of change notifications.

12. The method of claim 11, further comprising:
wherein said performing, by one or more other computing devices implementing a read-only node of the one or more read-only nodes of the distributed database system further comprises:
receiving a read request at the read-only node;
in response to receiving the read request:
determining a consistent state of the database to present for servicing the read request based, at least in part, on the particular one of the plurality of change notifications identified as the last change to be applied in order to complete the system transaction; and
servicing the read request based, at least in part, on the determined consistent state of the database, wherein at least one or more additional change notifications are received that are not identified as another last change to be applied.

13. The method of claim 12,
wherein a plurality of other change notifications including the different ones identified as the last change to be applied in order to complete a respective system transaction are received;
wherein said determining the consistent state of the database to present for servicing the read request comprises:
identifying one or more change notifications out of the plurality of other change notifications and the plurality of change notifications that are received prior to a received change notification identified as the last change to be applied;
wherein said servicing the read request based, at least in part, on the determined consistent state of the database, comprises:
including in a view of the database used to service the query the applied changes indicated in the identified one or more change notifications.

14. A non-transitory, computer-readable storage medium, storing program instructions that when executed by a plurality of computing devices cause the plurality of computing devices to implement:
receiving an update to a database maintained by a distributed database system, wherein the update is received at a read-write node of a plurality of nodes implementing the distributed database system;
performing one or more system transactions to apply the update to the distributed database system at the read-write node;
for each of the one or more system transactions:
generating at the read-write node a plurality of change notifications indicating changes to be applied in order to perform the system transaction;
identifying at the read-write node a particular one of the plurality of change notifications as the last change to be applied in order to complete the system transaction; and
sending the plurality of change notifications, including the identified particular change notification, to one or more read-only nodes of the plurality of nodes implementing the distributed database system, wherein the particular change notification indicates to the one or more read-only nodes the last change to be applied prior to presenting a state of the database that includes the system transaction.

15. The non-transitory, computer-readable storage medium of claim 14, wherein in said sending the plurality of change notifications, including the identified particular change notification, to the one or more read-only nodes of the plurality of nodes implementing the distributed database system, the program instructions cause the plurality of computing devices to further implement:
grouping the plurality of change notifications into one or more batches; and
sending the one or more batches to the one or more read-only nodes.

16. The non-transitory, computer-readable storage medium of claim 14, wherein at least one of the plurality of change notifications comprises one or more changes to system metadata maintained by the read-write node.

17. The non-transitory, computer-readable storage medium of claim 16, wherein the program instructions cause the plurality of computing devices to further implement:
receiving the plurality of change notifications at the one or more read-only nodes;
applying the changes indicated in the plurality of change notifications at the one or more read-only nodes;
receiving a read request at a read-only node of the one or more read only nodes;
in response to receiving the read request:
determining a consistent state of the database to present for servicing the read request based, at least in part, on the particular one of the plurality of change notifications identified as the last change to be applied in order to complete the system transaction; and
servicing the read request based, at least in part, on the determined consistent state of the database, wherein at least one or more additional change notifications are received that are not identified as another last change to be applied.

18. The non-transitory, computer-readable storage medium of claim 17,
wherein in said applying the changes indicated in the plurality of change notifications, the program instructions further cause the plurality of computing devices to implement:
modifying system metadata maintained at the read-only node to match the indicated one or more changes to the system metadata maintained at the read-write node;
wherein said servicing the read request is based, at least in part, on the modified system metadata maintained at the read-only node.

19. The non-transitory, computer-readable storage medium of claim 14, wherein at least one of the plurality of change notifications comprises one or more changes to one or more data pages of a plurality of data pages maintaining data for the database at a distributed storage system, and wherein each of the one or more read-only nodes and the read-write node may access the plurality of data pages stored for the database.

20. The non-transitory, computer-readable storage medium of claim 19, wherein the distributed database system is a network-based database service, wherein the distributed storage system is a multi-tenant, network-based distributed storage service.

* * * * *